June 24, 1930.  R. W. CANFIELD  1,766,979
MOVABLE GLASS DELIVERY CHUTE
Filed Jan. 30, 1929  2 Sheets-Sheet 2

Inventor
Robert W. Canfield
by Robm A Brown
Attorney.

Patented June 24, 1930

1,766,979

UNITED STATES PATENT OFFICE

ROBERT W. CANFIELD, OF WEST HARTFORD, CONNECTICUT, ASSIGNOR TO HARTFORD-EMPIRE COMPANY, OF HARTFORD, CONNECTICUT, A CORPORATION OF DELAWARE

MOVABLE GLASS-DELIVERY CHUTE

Application filed January 30, 1929. Serial No. 336,073.

My invention relates to apparatus for making glassware, and more particularly to apparatus for the proper delivery of charges of molten glass from an automatic feeder to the molds of a shaping machine.

One object of my invention is to provide means for assuring the delivery of charges to the molds only when the molds and their cooperating parts are in the proper condition to receive such charges, and positively to prevent the delivery of glass to the machine at any other times.

More specifically, an object of my invention is to provide a movable delivery chute and means controlled by the position of the parts of the shaping machine for causing the chute to move into a delivery position.

A further object of my invention is to provide such a movable chute which may be selectively maintained in the non-delivery position even when the mechanism of the fabricating machine is in a position to receive the charges.

A further object of the invention is to provide suitable adjustments for the delivery chute to insure the proper delivery of charges and to provide a cushioning device to insure against excessive jars to the chute in its movement from one position to the other.

Further objects of my invention will appear from the following specification and claims.

I have illustrated one embodiment of the mechanical features of my invention in the accompanying drawings in which.

Figure 1:
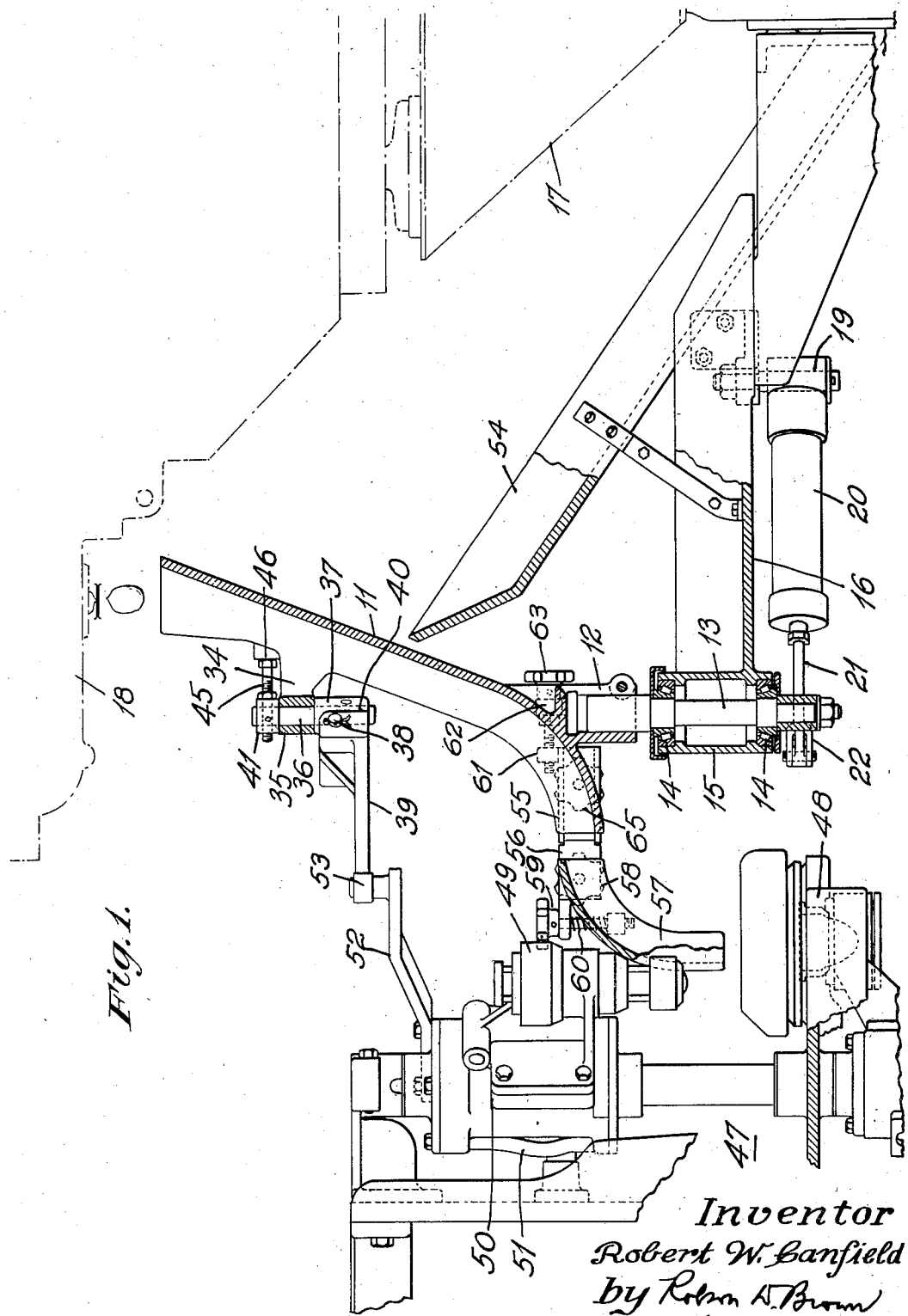
Fig. 1 shows an elevation of the device used for illustration with parts broken away and parts in section, the delivery chute being shown in delivery position and the forming machine in operative receiving position.

In general I have shown my invention as embodied in a movable delivery chute which is mounted to turn upon a vertical axis between a delivery position, in which the upper end of the chute is in alignment with the feeding opening of an automatic feeder and the lower end is in alignment with one of the molds of the shaping machine when that mold is at the charging station, and a non-delivery position in which the upper and lower ends of the chute are out of alignment with the feeding outlet and the molds of the said shaping machine, respectively. There is a normal tendency for the chute to swing to the non-delivery position and the chute is swung at suitable times to the delivery position by means of a cam structure carried by the chute and a coacting roller carried by mechanism associated with the mold.

The arrangement in general is such that when parts of the forming machine which cooperate with the mold (specifically shown as a combined press and blow head,) are in the position in which they coact with the mold to form glassware, the cam roll cannot contact with the cam on the chute and thus the chute remains in the non-delivery position. When the head is in a position removed from the mold, (the normal position at the charging station) the roll and cam are brought into cooperative relation and the chute is swung into delivery position. A suitable cullet chute is provided and so positioned as to carry off charges or glass which are not delivered to the delivery chute.

Referring particularly to the drawings:

A delivery chute 11 has formed therewith a split clamp 12 by which it is fastened to the vertical shaft 13. The shaft 13 is mounted within roller bearings 14 which are contained in a bearing casing 15 carried on a bracket 16 which in turn is fastened to any suitable support, as for instance the support 17 for the feeder indicated at 18.

Figure 2:
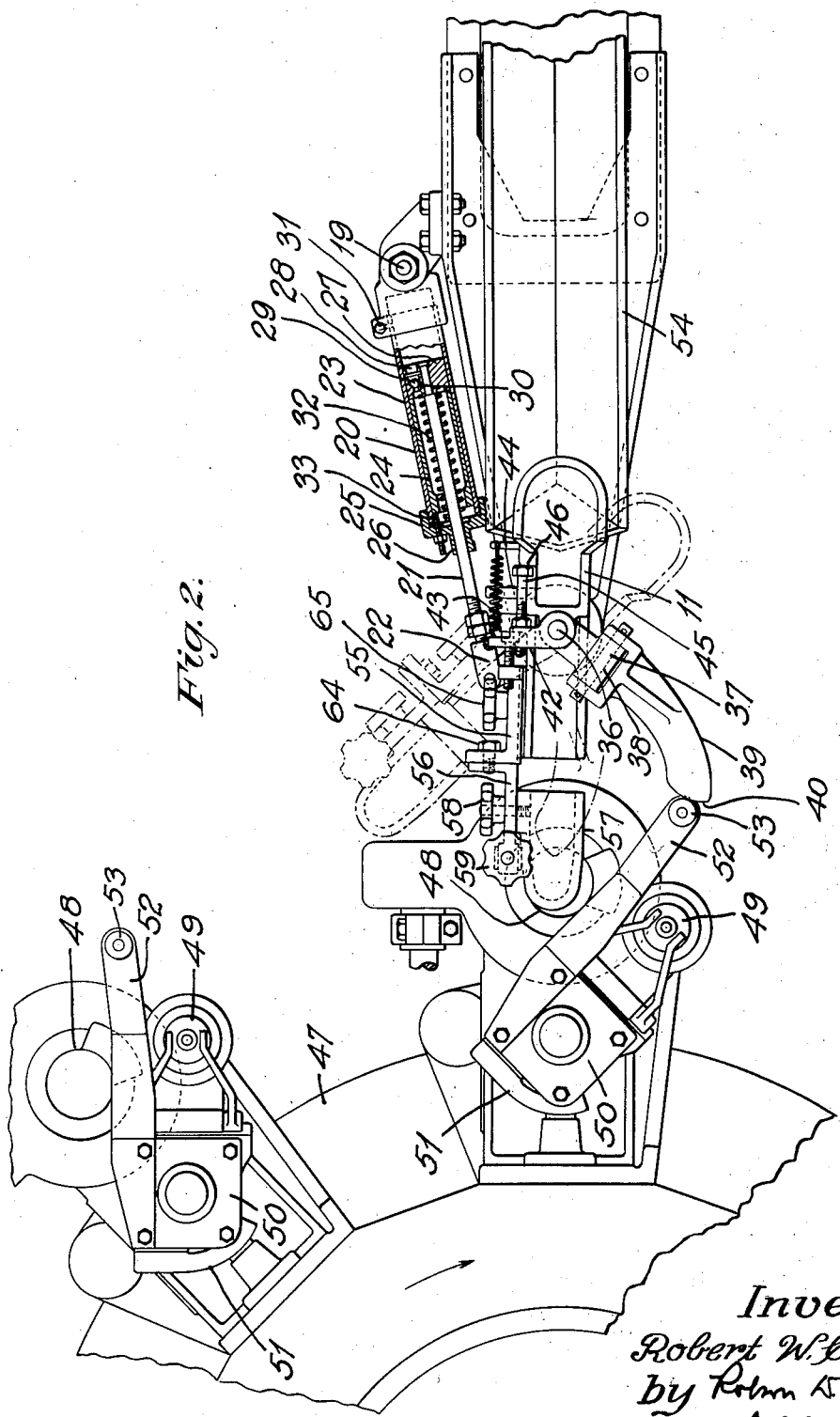
Fig. 2 shows a plan view of the parts as shown in Fig. 1 with the delivery chute shown in the delivery position in full lines and in the normal or non-delivery position in dotted lines.

In order to turn the shaft 13, a crank arm 22 is fastened to the said shaft and a rod 21 connected to the end thereof is urged by a spring controlled dashpot 20. The dashpot 20 is pivotally fastened to the bracket 16 upon a vertical pivot pin 19 and tends to cause a turning movement of the shaft 13 to carry the chute to its non-delivery position. Referring particularly to Fig. 2, the dash pot is shown as comprising a cylinder

23 closed at the end nearest the pivot 19 and carrying at its other end a cover 25 provided with an opening 26 for the passage of the rod 21 into the cylinder. The inner end of the rod 21 is fastened to the head 27 of a piston which is provided with a sleeve portion 24. The head 27 has an opening 28 therethrough, which opening contains a ball check valve 29 adapted when the head is forced toward the pivot 19 to seat at 30. The outer casing 23 has a restricted vent opening 31 near the pivoted end for the slow escape of air ahead of the piston. A spring 32 is arranged around the rod 21 between the head 27 and the cover 25. Thus a resilient cushioned moving force is provided for turning the shaft 13 and the chute 11 in a clockwise direction as viewed in Fig. 2. This force always tends to move the chute from its delivery position to its normal non-delivery position.

An adjusting screw 33 is threaded through the cover 25 and limits the movement of the sleeve 24 in the direction away from the pivot 19. It thus limits the movement of the chute 11 in its counterclockwise travel from its non-delivery position to its delivery position. By these means the chute may be accurately positioned to deliver charges to the molds.

The chute may be moved, against the pressure of spring 32 to the delivery position by the following mechanism: A bracket 34, formed integral with the chute 11, carries a bearing 35 through which a vertical pivot pin 36 extends. Fastened to the lower end of this pin 36 is a bracket 37 to which a cam arm 39 is pivoted as at 38. The arm is provided with a suitable stop shoulder 40 which prevents the arm from swinging below the horizontal position while permitting it to swing upwardly. The arm 39 is formed with a cam surface for coaction with a cam roll carried by the forming machine as hereinafter described. The upper end of the pin 36 has fastened thereto an upper fixed collar 41 which carries a crank arm 42 (see Fig. 2) connected by a spring 43 (which is much stronger than the spring 32) to a projection 44 on the chute 11. The arm 42 also carries an adjusting screw 45 designed to bear normally against a shoulder 46 on the chute 11. By this spring and adjusting screw a one way resilient connection is maintained between the cam arm 39 and the chute 11, and the screw 45 also serves to position the arm 39 for proper coaction with the cam rolls.

The forming machine 47 illustrated is of the rotating turret, multiple mold type; but it is obvious that any type of forming machine having moving parts could be substituted therefor. In the device illustrated, a turret carries molds 48 and combined press and blow heads 49. The heads 49 are moved toward and into the molds to form the glass articles by pressing and blowing and away from the molds to permit charging of the molds and the removal of the finished articles. They are moved vertically by moving pressure cylinders 50 and guided horizontally by cam grooves in the cam plates 51.

The cylinders 50 have fastened thereto cam roll arms 52, each arm carrying a cam roll 53 adapted to coact with the cam surface of the arm 39 when the cylinders are in their upper positions. When the cylinders are in their lower positions the cam rolls fail to contact with the cam arms and hence the chute remains in the non-delivery position when a head is acting with the mold.

A cullet chute 54 is fastened to the bracket 16 in any suitable manner and is positioned directly below the outlet of the feeder 18 so that charges of glass fed therefrom, if not received by the delivery chute 11, will fall into the cullet chute and be directed thereby to the cullet bin.

The delivery chute is preferably provided with a deflector 57 which is mounted for movement with the chute and is made adjustable relative thereto. A tongue formed integral with the lower end of the delivery chute 11 is arranged to allow a horizontally grooved bracket 55 to slide thereon. A hole in a projection 61 on the said bracket 55 registers with a hole in a projection 62 on the chute and an adjusting screw 63 passes through the hole in the bracket 62 and is threaded into the hole in the bracket 61. Thus by the screw 63 the position of the bracket 55 may be adjusted horizontally relative to the chute 11. A clamp 65 is provided for more securely fastening the bracket 55 to the delivery chute 11 and for holding the bracket in any adjusted position. A second bracket 56 is fastened to the bracket 55 by means of a cap screw 64 and a slot, in such a way that by means of the adjusting screw 63 and the cap screw 64 the second bracket 56 is adjustable, relative to the chute 11, in two perpendicular horizontal directions. The deflector 57 is adjustably fastened to the bracket 56 and is accordingly adjustable therewith. It is pivotally mounted upon the said second bracket 56 on a horizontal pivot formed by a clamp screw 58 inserted through the bracket 56 and is angularly adjusted on the said pivot by means of the adjusting screw 59 which passes through an enlarged aperture in a lug on the bracket 56 and is threaded in a lug on the deflector 57 and carries the compression spring 60 between these lugs. The deflector 57 is accordingly adjustable in any direction relative to the chute 11 by means of one or more of the screws 59, 63 and 64.

In the operation of the device disclosed in the drawings from the position of the parts shown in full lines, a charge of glass C is delivered from the feeder 18 and falls to the chute 11. It slides down the said chute and is deflected by the deflector 57 into one of the molds 48 in the proper manner, this being assured by the proper adjustment of the deflector and selection of the chute parts. After the charge has been delivered, the rotation of the turret of the forming machine 47 carries the arm 52 and the roll 53 beyond the cam surface 40 which permits the spring 32 to move the chute 11 to its non-delivery position, this movement being opposed by the dash pot 20. As the next succeeding mold 47 approaches the position at which it is desired to feed the charge of glass thereto, a cam roll arm 52 brings a cam roller 53 into contact with a portion of the chute control arm 39 and thus turns the arm 39. The projection 42 associated with the said arm exerts a resilient pulling effect upon the chute 11 through the spring 43 and the projection 44 and thus tends to move the chute 11 to its delivery position. The valve 29 moves from its seat and prevents the dash pot from causing any undue retardation of the movement and the spring 43 is so much stronger than the spring 32 that except under abnormal conditions the screw 45 is held against the shoulder 46 until the adjusting screw 33 stops movement of the sleeve 24 and so stops the delivery chute 11 in its delivery position. Then the screw 45 may move away from the shoulder 46 to compensate for any over-travel of the cam arm.

Should it happen that the cylinder 50 has, on account of insufficient air pressure, or for any other reason, failed to reach its upper position in time for the roll 53 to contact with the cam arm 39 the chute is not moved to delivery position. Should the cylinder fail to rise before reaching the charging station but should rise at that station the arm 39 will merely swing upwardly about the pivot 38, and thus prevent any breakage of parts. Of course, in such cases, the delivery chute is not turned to its delivery position and the charge of glass falls, as in all cases when the delivery chute is not in its delivery position, into the cullet chute 54 and goes to the cullet bin.

The pivot 38 on the cam arm 39 serves also as a means for rendering the delivery chute inoperative to deliver mold charges, whenever such a condition may be desired, inasmuch as by moving the controlling arm on the said pivot 38 toward its upper position allowing it to remain there by gravity or by hooking it up in that position by any suitable means (not shown), the roll 53 will fail to contact with the cam surface and the chute 11 will remain in its non-delivery position.

It is obvious that I may use forming machines of many other types, inasmuch as any forming machine having moving parts could be arranged to make those moving parts operative to cause the movement of the delivery chute from its normally inoperative position to an operative or delivery position at the instant that the delivery of the mold charges is desired.

It is to be understood that the above described embodiment of this invention is for the purpose of illustration only, and various changes may be made therein without departing from the spirit or scope of the invention.

I claim as my invention:

1. In glassware making apparatus, means for feeding charges of molten glass, means for forming the charges of glass into glassware, a movable chute for delivering the charges of glass from the feeding means to the forming means, the said forming means having a head adapted to assist in the forming of the glassware, the said head being movable, and means operated by a movement of the said head for moving the chute.

2. In glassware making apparatus, means for feeding charges of molten glass, means for forming the charges into glassware, a movable chute for delivering the charges from the feeding means to the forming means, the forming means having movable molds, and means associated with said molds for controlling the moving of the delivery chute.

3. In glassware making apparatus, a feeder, a forming machine, a movable chute for delivering charges of molten glass from the feeder to the forming machine, an adjustable deflector connected to the said chute, and means for moving said chute and said adjustable deflector into and out of position for delivering charges of molten glass to the forming machine.

4. In apparatus for making glassware, means for feeding charges of molten glass, means for forming said charges into glassware, a chute for delivering the charges of glass from the feeding means to the forming means, said chute being movable from a normal non-delivery position to a delivery position and means for resiliently urging the chute from either one of the said positions to the other position.

5. In glassware making apparatus, a feeder, a forming machine having a vertically movable combined press and blow head and means operative only when the press and blow head is in a raised position for delivering charges of molten glass from the feeder to the forming machine.

6. In apparatus for making glassware, a feeder for feeding charges of molten glass, a forming machine for forming the said charges into glassware and having a mold and a head coacting with the said mold to perform a step in the process of making the glassware and means for delivering the charges of molten glass from the said feeder to the said forming machine operative only when the coacting head is in a selected position.

7. In apparatus for making glassware, a feeder for feeding charges of molten glass, a forming machine for forming the charges of glass into glassware, movable means for delivering the charges of glass from the feeder to the forming machine and means for controlling the movement of the delivery means comprising a cam arm fastened upon the forming machine and a cam surface coacting with the said cam arm and connected to the delivery means.

8. In apparatus for making glassware, a chute for delivering charges of molten glass, an adjustable deflector fastened to the delivery end of said chute and movable therewith, and means for moving the said chute and deflector from a delivery position to a non-delivery position.

9. In glassware making apparatus, means for feeding charges of molten glass, means for forming the charges into glassware, a movable chute for delivering the charges of glass from the feeding means to the forming means and means operated by the movement of a part of the forming means for moving the chute.

10. In apparatus for making glassware, means for feeding charges of molten glass, means for forming said charges into glassware, a chute for delivering the charge of glass from the feeding means to the forming means, said chute being movable from a normal non-delivery position to a delivery position and means for resiliently urging the chute from the non-delivery position to the delivery position.

Signed at Hartford, Connecticut this 26th day of January, 1929.

ROBERT W. CANFIELD.